March 29, 1966 J. C. FATZ 3,243,600

COMPUTER CIRCUIT FOR USE AS A FORWARD COUNTER, A REVERSE COUNTER OR SHIFT REGISTER

Filed June 13, 1960 3 Sheets-Sheet 1

INVENTOR

JOHN C. FATZ

BY Roger W. Jensen

ATTORNEY

INVENTOR.
JOHN C. FATZ
BY Roger W. Jensen
ATTORNEY

March 29, 1966 J. C. FATZ 3,243,600

COMPUTER CIRCUIT FOR USE AS A FORWARD COUNTER, A REVERSE COUNTER OR SHIFT REGISTER

Filed June 13, 1960 3 Sheets-Sheet 3

*INVENTOR.*
JOHN C. FATZ

*BY* Roger W. Jensen

ATTORNEY

United States Patent Office 3,243,600
Patented Mar. 29, 1966

3,243,600

COMPUTER CIRCUIT FOR USE AS A FORWARD COUNTER, A REVERSE COUNTER OR SHIFT REGISTER

John C. Fatz, St. Petersburg, Fla., assignor to Honeywell Inc., a corporation of Delaware Filed June 13, 1960, Ser. No. 35,709
8 Claims. (Cl. 307—88.5)

This invention concerns an improvement in computer "bit" circuitry and refers to means for causing one bit to assume a state which is dependent upon the state of a second bit. This invention refers particularly to forward counters, reverse counters, and shift registers. A forward counter is a counter that increases its contents (stored information) by 1 (count in the positive direction) with each input pulse while a reverse counter is a counter that decreases its contents by 1 (count in the negative direction or subtract) with each input pulse. A shift register is a storage or memory device that is capable of receiving or yielding up stored multidigit binary numbers in either serial or parallel form.

A "bit" may be defined as a flip-flop or multivibrator having two stable states, the states representing either a "1" or "0." The flip-flops used in this invention are adapted to receive various input signals, such as, shift register input and/or complement input signals, counter input signals, clock signals and steering signals.

When the invention is used as a forward counter the counter input pulses toggle the first flip-flop comprising a first pair of transistors. The output of the second transistor of the first flip-flop toggles the second flip-flop comprising a second pair of transistors. The output of the second transistor of the second flip-flop toggles the third flip-flop comprising a third pair of transistors etc. Thus, the flip-flops comprise a scale of two binary counter where the first bit represents $2^0$, the second bit represents $2^1$, a third bit represents $2^2$ and so on. The operation of the invention as a reverse counter is much the same as a forward counter. The counter input pulses toggle the first flip-flop. Now however, instead of the output of the second transistor of the first flip-flop toggling the second flip-flop, the output of the first transistor of the first flip-flop toggles the second flip-flop. Similarly, the output of the first transistor of the second flip-flop toggles the third flip-flop etc. Since the output of the first and second transistors of each flip-flop are "complements" it can be seen that when the invention is used as a reverse counter the complement output of the first bit is added to the second bit, the complement of the second bit is added to the third bit, etc. The addition of complements is the same as subtraction. To explain this concept further assume that 350 is to be subtracted from 800 on an adding machine which has a maximum capacity of 1000. The number 800 is entered on the machine and the complement of 350 (1000−350=650) is added to 800. The sum of 800 and 650 is 1450. However, the machine will only register 450, which is 350 subtracted from 800.

When the invention is used as a shift register the output of the device being "read" is coupled to both the input and the complement input of the shift register. If only one output is available, it can be converted to input and complement input by standard circuitry. Referring to the shift register input, a first voltage level represents "0" and a second voltage level represents "1." The complementary shift register input will be just the opposite. For example, assume that on the shift register input a −2 volts on the input represents a "0" and a −12 volts represents a "1." Then on the complementary shift register input a −2 volts would represent a "1" and a −12 volts would represent a "0." Assume that the binary number 101 is to be entered into the register. The first digit is a "1" so the input is at −12 volts and the complement input is at −2 volts. These voltages are not sufficient to change the state of the first bit. However, when a clock pulse is applied it is blocked from the base of the first transistor of the first flip-flop due to the −12 volts on the shift register input, but it is applied to the base of the second transistor. This positive pulse cuts off the second transistor and changes the state of the first bit to a "1" state. The "1" is now entered in the register. The next digit of the binary number is a "0," and the voltages to the input and complement input are changed to the values described above. When a clock pulse is applied the register is again shifted so that now the "0" is also entered. A similar operation occurs when the next "1" digit of the binary number is applied. A detailed explanation of how this is accomplished will be given hereinafter.

It is an object of this invention therefore to provide an improvement in computer "bit" circuitry.

It is an other object of this invention to provide a computer circuit the operation of which can be varied by changing the bias level of a controlling gate.

A further object of this invention is to provide a computer circuit that can be used as a forward counter, reverse counter, or shift register.

These and other objects of my invention will become apparent to those skilled in the art upon consideration of the accompanying specification, claims, and drawings of which:

Figure 1:
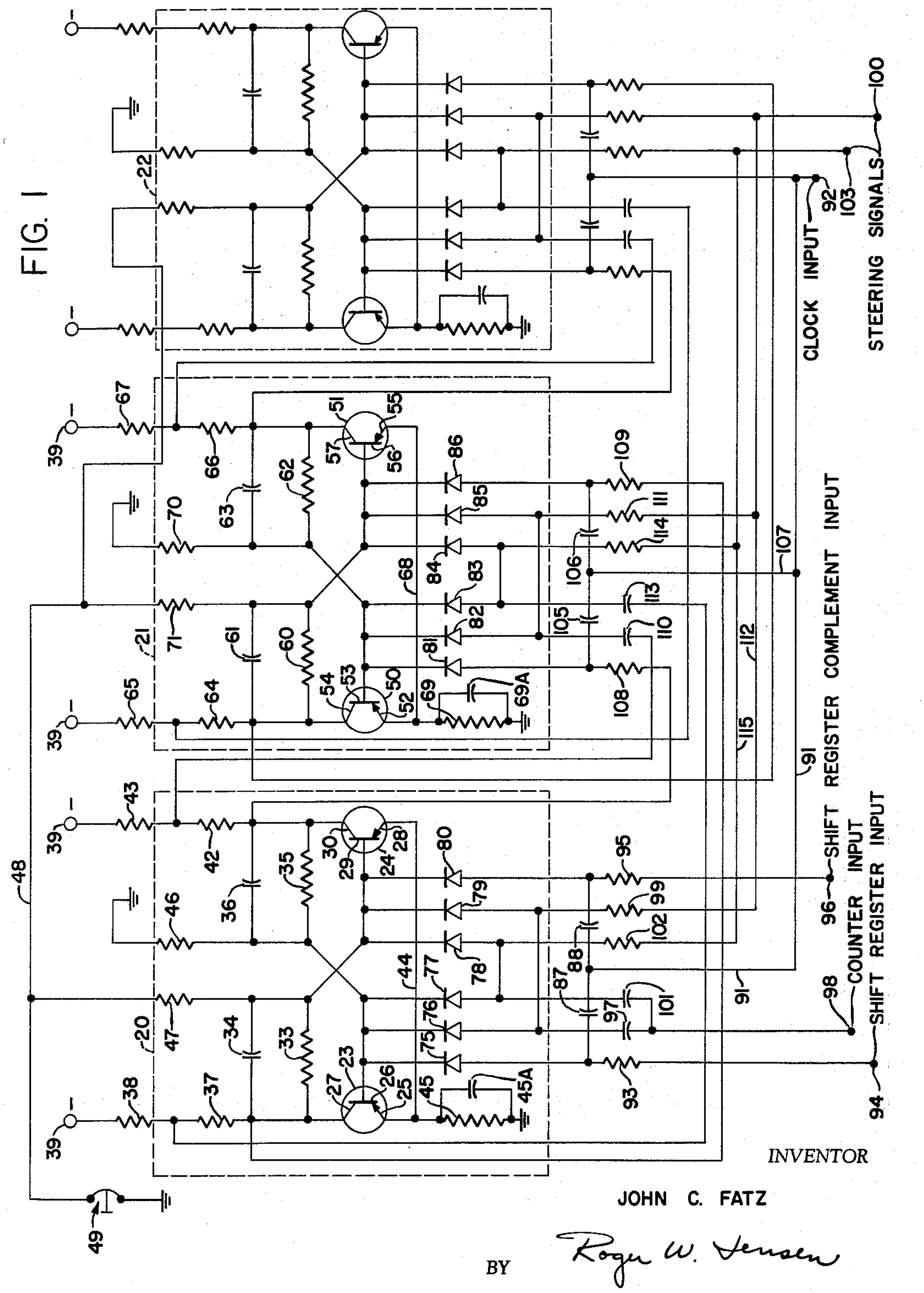
FIGURE 1 is a schematic diagram of an embodiment of this invention.

Referring to FIGURE 1 there is shown bistable devices or "bits" 20, 21, and 22. Bistable device 20 comprises a first transistor 23 and a second transistor 24; transistor 23 having an emitter electrode 25, a base electrode 26 and a collector electrode 27 and transistor 24 having an emitter electrode 28, a base electrode 29, and a collector electrode 30. Transistors 23 and 24 are cross coupled, collector to base, by means of a first parallel combination of a resistor 33 and a capacitor 34 and by means of a second parallel combination of a resistor 35 and a capacitor 36, to form a flip-flop. Collector 27 of transistor 23 is further connected by means of a resistor 37 in series with a resistor 38 to a source of energizing potential 39. Collector 30 of transistor 24 is further connected by means of a resistor 42 in series with a resistor 43 to the potential source 39. Emitter 25 of transistor 23 and emitter 28 of transistor 24 are connected together by means of a conductor 44. Conductor 44 is connected to a common conductor, in this case ground, by means of a resistor 45 and parallel capacitor 45A. The base 26 of transistor 23 is connected by means of a resistor 46 to ground. The base 29 of transistor 24 is connected by means of a resistor 47 and a conductor 48 to a first terminal of a reset switch 49. A second terminal of the reset switch 49 is connected to ground.

Bistable device 21 comprises a transistor 50 and a transistor 51; transistor 50 having an emitter 52, a base 53, and a collector 54 and transistor 51 having an emitter 55, a base 56 and a collector 57. Transistors 50 and 51 are cross coupled, collector to base, by means of a first parallel combination of a resistor 60 and a capacitor 61 and by means of a second parallel combination of a resistor 62 and a capacitor 63 to form a flip-flop. Collector 54 of transistor 50 is further connected by means of a resistor 64 in series with a resistor 65 to the source of energizing potential 39. Collector 57 of transistor 51 is connected by means of a resistor 66 in series with a resistor 67 to the potential source 39. The emitter 52 of transistor 50 and the emitter 55 of transistor 51 are connected together by means of a common conductor 68. Conductor 68 is connected to ground by means of a resistor 69 and parallel capacitor 69A. The base 53 of transistor 50 is connected to ground by means of a resistor 70. The base 56 of transistor 51 is connected to conductor 48 by means of resistor 71.

Additional stages may be added to this invention depending upon the requirements of the particular application. FIGURE 1 shows the addition of one additional stage, binary device 22. Since binary device 22 is similar to the previously described binary devices 20 and 21, it will not be described further.

Base 26 of transistor 23 is connected to the cathodes of three diodes, gating devices, or switching devices, 75, 76, and 77, hereinafter referred to as diodes. Similarly base 29 of transistor 24 is connected to the cathodes of three diodes 78, 79, and 80; the base 53 of transistor 50 is connected to the cathodes of diodes 81, 82, and 83; and the base 56 of transistor 51 is connected to the cathodes of diodes 84, 85 and 86. The anodes of diodes 75 and 80 are connected together by means of a capacitor 87 in series with a capacitor 88. The junction between capacitors 87 and 88 is connected by means of a conductor 91 to a terminal 92. Terminal 92 is adapted to be connected to a source of clock pulses. The anodes of diodes 76 and 79, are tied directly together as are the anodes of diodes 77 and 78. The anode of diode 75 is further connected through a resistor 93 to a terminal 94 which is adapted to be connected to a source of shift register input pulses. The anode of diode 80 is further connected through a resistor 95 to a terminal 96 adapted to be connected to a source of shift register complement input pulses. The anodes of diodes 76 and 79 are connected by means of a capacitor 97 to a terminal 98 adapted to be connected to a source of counter input pulses, and by means of a resistor 99 and a conductor 112 to a terminal 100. Terminal 100 is adapted to be connected to a source of control, bias or steering signals. The anodes of diodes 77 and 78 are connected by means of a capacitor 101 to terminal 98, and by means of a resistor 102 and a conductor 115 to a terminal 103. Terminal 103 is adapted to be connected to a source of control, bias or steering signals.

The anodes of diodes 81 and 86 are connected together by means of capacitor 105 in series with a capacitor 106. The junction between capacitors 105 and 106 is connected by means of a conductor 107 and conductor 91 to terminal 92. The anode of diode 81 is further connected by means of a resistor 108 to the collector 30 of transistor 24. The anode of diode 86 is further connected by means of a resistor 109 to the collector 27 of transistor 23. The anodes of diodes 82 and 85 are connected together, as are the anodes of diodes 83 and 84. The anodes of diodes 82 and 85 are further connected by means of a capacitor 110 to the junction between resistors 42 and 43, and by means of a resistor 111 and a conductor 112 to terminal 100. The anodes of diodes 83 and 84 are further connected by means of a capacitor 113 to the junction between resistors 37 and 38, and by means of a resistor 114 and a conductor 115 to terminal 103.

*Forward counter operation*

Figure 2:
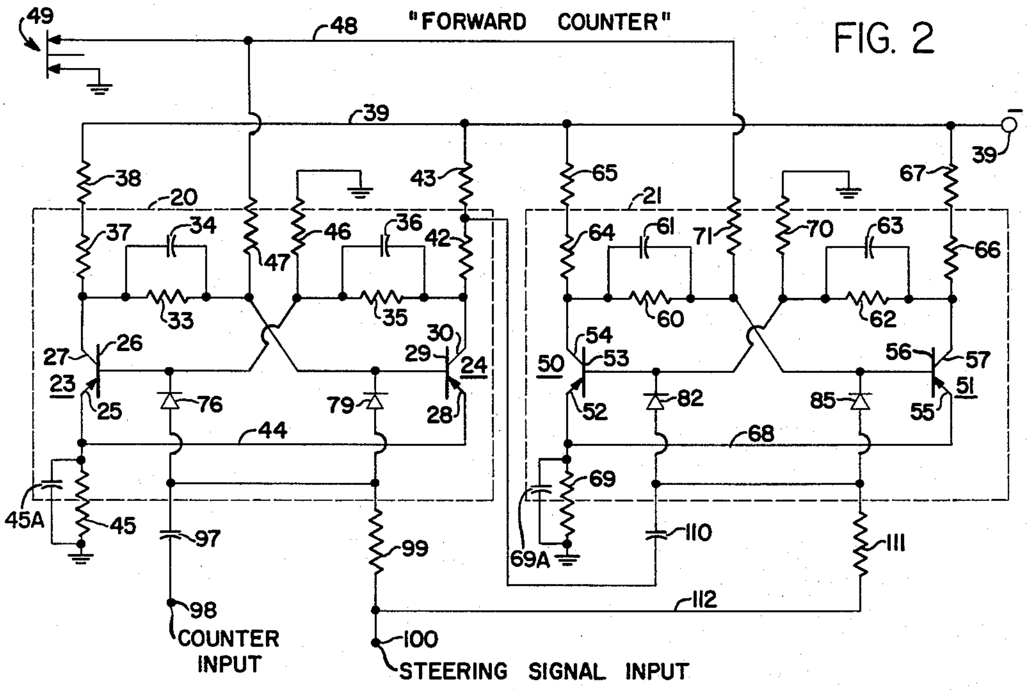
FIGURE 2 is a schematic diagram of the equivalent circuit of the invention when used as a forward counter.

In considering the operation of the circuit in FIGURE 1 assume that all the bistable devices are in their "0" state, that is, transistors 24, 51 etc. are conducting and transistors 23, 50, etc., are cut off. Assume further that a −12 volt steering signal is applied at terminal 103 and also at the shift register and complementary shift register inputs 94 and 96; that a −2 volt steering signal is applied at terminal 100, and that the clock pulses are turned off. Under these conditions diodes 75, 77, 78, 80, 81, 83, 84, and 86 are back biased and are effectively removed from the circuit. These are the conditions that are necessary for the invention to function as a forward counter. FIGURE 2 shows the effective equivalent circuit of FIGURE 1 when used as a forward counter.

Referring to FIGURE 2, when transistor 23 is off there will be a relatively large negative voltage at its collector 27. This negative voltage will be coupled through the parallel combination of resistor 33 and capacitor 34 to the cathode of diode 79 and will forward bias this diode. Similarly when transistor 50 is off, there will be a forward bias applied to diode 85.

When a positive pulse appears at the counter input terminal 98, it is coupled through capacitor 97 and diode 79 to the base 29 of transistor 24. This positive pulse tends to drive the transistor 24 into cutoff. As the conduction of transistor 24 decreases the negative potential at its collector 30 increases. This increase in negative potential is coupled through the parallel combination of resistor 35 and capacitor 36 to the base 26 of transistor 23 and drives transistor 23 into conduction. As the conduction of transistor 23 increases the potential at its collector 27 goes more positive and this positive potential is coupled through resistor 33 and capacitor 34 to the base 28 of transistor 24 thereby further reducing the conduction of transistor 24. This action continues until transistor 23 is fully conducting and transistor 24 is cut off. Bistable device 20 is now in its "1" state and since device 20 represents the $2^0$ digit it can be seen that the counter has counted one pulse.

When transistor 24 is off there will be a relatively large negative voltage at its collector 30. This negative voltage will be coupled through the parallel combination of resistor 35 and capacitor 36 to the cathode of diode 76, forward biasing this diode.

When a second positive pulse appears at terminal 98 it is coupled through capacitor 97 and diode 76 to the base 26 of transistor 23. This positive pulse tends to drive transistor 23 into cutoff. As the conduction of transistor 23 decreases, the increase in negative potential at its collector 27 is coupled through the parallel combination of resistor 33 and capacitor 34 to the base 29 of transistor 24, thereby driving transistor 24 into conduction. As the conduction of transistor 24 increases, the potential at its collector 30 goes more positive and this positive going potential is coupled through the parallel combination of resistor 35 and capacitor 36 to the base 26 of transistor 23 thereby tending to drive transistor 23 further into cutoff. This cycle continues until transistor 23 is again cut off and transistor 24 is conducting. The positive going potential at the junction between resistors 42 and 43 and the collector circuit of transistor 24, is coupled through capacitor 110 and diode 85 to the base 56 of transistor 51. This positive voltage tends to drive transistor 51 into cutoff in the same manner as explained previously for transistors 23 and 24. When transistor 51 is driven into cutoff, transistor 50 will be fully conducting. It can now be seen that bistable device 20 is in its "0" state and bistable device 21 is in its "1" state. Since bistable device 21 represents the digit $2^1$ it can be seen the counter has counted two pulses.

The operation of the forward counter continues as long as positive pulses are applied to terminal 98, the maximum capacity being limited solely by the number of bistable devices employed.

*Reverse counter operation*

Figure 3:
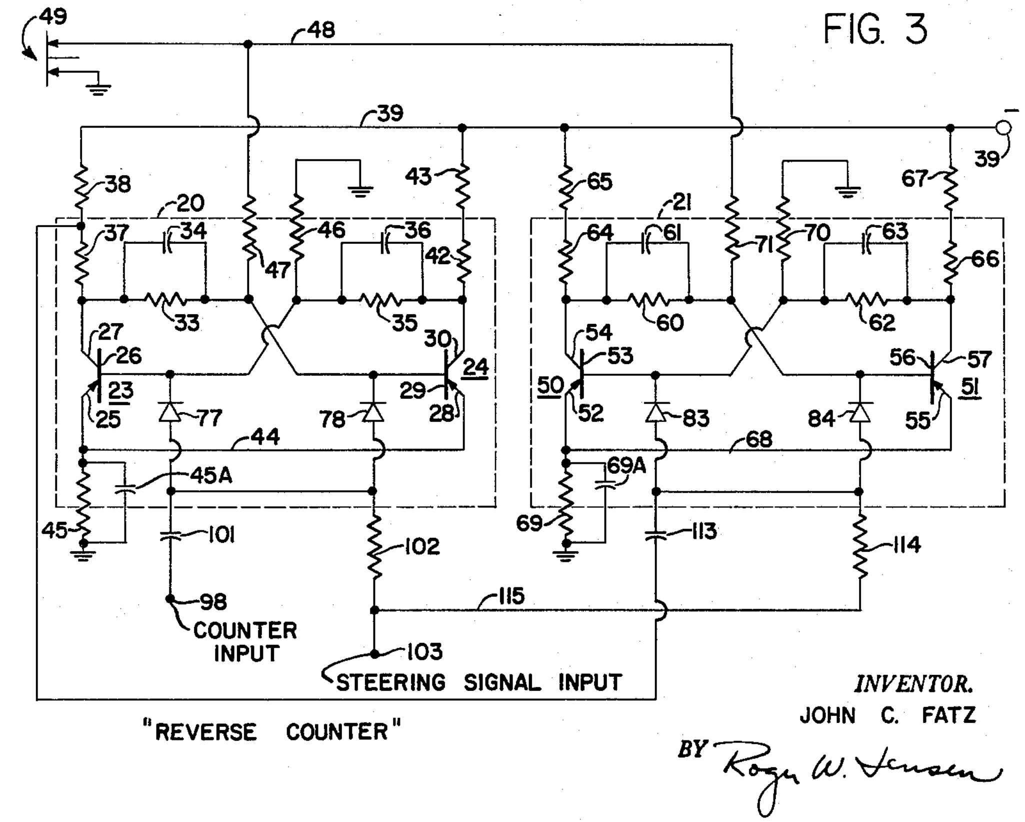
FIGURE 3 is a schematic diagram of the equivalent circuit of the invention when used as a reverse counter.

In considering the operation of the invention as a reverse counter assume that all the bistable devices are in their "1" state, that is transistors 23, 50, etc., are conducting and transistors 24, 51, etc., are cut off. Assume further that a —12 volt bias signal is applied at terminal 100 and at the shift register and complementary shift register inputs, a —2 volt bias signal is applied at terminal 103, and that the clock pulses are turned off. The —12 volt bias signal at terminal 100 and at the register input terminals 94 and 96 back bias diodes 75, 76, 79, 80, 81, 82, 85 and 86, and effectively remove these diodes from the circuit. FIGURE 3 shows the effective equivalent circuit of FIGURE 1 when used as a reverse counter.

Referring to FIGURE 3, when transistor 24 is off, a relatively large negative voltage will appear at its collector 30. This negative voltage will be coupled through the parallel combination of resistor 35 and capacitor 36 to the cathode of diode 77, forward biasing this diode. Similarly, when transistor 51 is cut off a relatively large negative voltage at its collector 57 is coupled through the parallel combination of resistor 62 and capacitor 63 to the cathode of diode 83 forward biasing this diode.

When a positive pulse is applied to the counter input terminal 98, it is coupled through capacitor 101 and diode 77 to the base 26 of transistor 23. This positive voltage on the base of transistor 23 tends to drive the transistor into cutoff. As explained previously in the forward counter operation, when one transistor in a bistable device is driven to its cutoff state the other transistor is driven to its fully conducting state. Therefore since transistor 23 is being driven into cutoff transistor 24 will conduct.

Bistable device 20 is now in its "0" state while bistable device 21 is still in its "1" state. Since bistable device 20 represents $2^0$ and bistable device 21 represents $2^1$, there are now only two bits of information stored in the counter where previous to the incoming pulse there had been three bits stored in the counter. It can be seen that the counter is now adding in the reverse direction, in other words, subtracting.

With transistor 23 cut off, the negative potential at its collector is coupled through resistor 33 and capacitor 34 to the cathode of diode 78 and forward biases this diode. When another positive pulse appears at terminal 98 it is coupled through capacitor 101 and diode 78 to the base of transistor 24. This positive voltage cuts off the transistor 24 as explained above. As transistor 24 cuts off transistor 23 is driven into conduction and the potential at the junction of resistors 37 and 38 in the collector circuit of transistor 23 increases in a positive direction. This positive going potential at the junction of transistors 37 and 38 is coupled through capacitor 113 and diode 83 to the base of transistor 50, cutting off this transistor. When transistor 50 is cut off transistor 51 is driven into conduction. Bistable device 20 is now in its "1" state and bistable device 21 is in its "0" state. The total number of bits stored in the counter has been reduced to one. Each time a positive pulse appears at the counter input terminal 98 the number of bits stored in the register will be decreased by one.

*Shift register operation*

Figure 4:
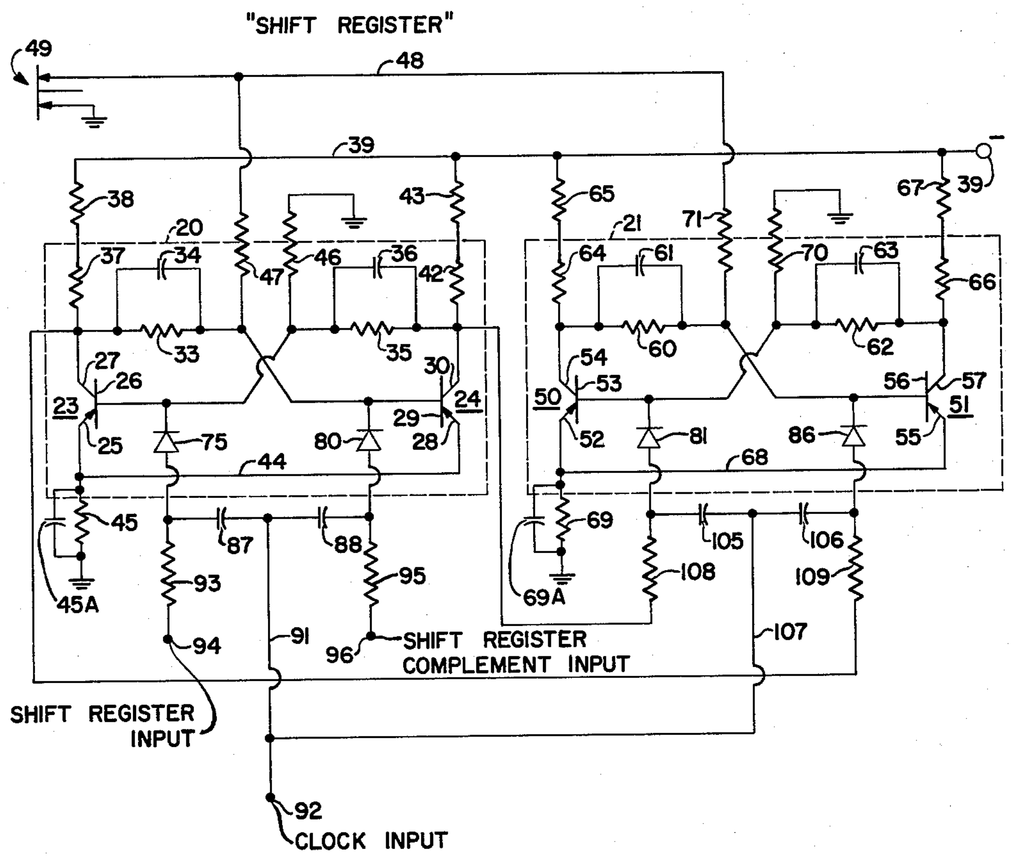
FIGURE 4 is a schematic diagram of the equivalent circuit of the invention when used as a shift register.

When the invention is operated as a shift register a —12 volt steering signal is applied to terminals 100 and 103. This steering voltage back biases diodes 76, 77, 78, 79, 82, 83, 84 and 85 and effectively removes them from the circuit. The clock pulses are turned on and applied to terminal 92, and the output of the device being "read" is coupled to the shift register and complement shift register input terminals 94 and 96. FIGURE 4 shows the shift register effective equivalent circuit of FIGURE 1.

Referring to FIGURE 4 a —2 volt signal on the shift register input terminal 94 represents a "0" and a —12 volt signal represents a "1." The complementary input terminal 95 will be just the opposite, that is, a —12 volt signal represents a "0" and a —2 volt signal represents "1."

Assume that all the bistable devices are in the "0" state and that the binary number 11 is to be entered in the register. When the bistable devices are in the "0" state, transistors 24 and 51 are conducting and transistors 23 and 50 are cut off. When transistors 24 and 51 conduct there is approximately a —2 volt potential at their collectors. A —2 volt potential on the collector 30 of transistor 24 is coupled through resistor 108 to diode 81. Similarly, when transistors 23 and 50 are cut off there is approximately a —12 volt potential at their collectors and this —12 volts is coupled from the collector 27 of transistor 23 through resistor 109 to diode 86.

The first digit of the binary number to be entered is a "1," therefore terminal 94 is at a —12 volts and terminal 96 is at a —2 volts. When a positive clock pulse appears at terminal 92 it is blocked from transistors 23 and 50 by the —12 volt potential appearing at terminal 94 and diode 86 respectively. This positive clock pulse is coupled, however, through capacitor 88 and diode 80 to the base 29 of transistor 24, and through capacitor 105 and diode 81 to the base 53 of transistor 50. The positive pulse on the base 29 of transistor 24 drives transistor 24 into cutoff and allows transistor 23 to conduct. The positive clock pulse applied to the base 53 of transistor 50 tends to drive this transistor into cutoff but since transistor 50 is already cut off the pulse has no effect on the state of bistable device 21.

Since transistor 23 is now conducting the voltage at its collector 27 is approximately —2 volts, and this potential is coupled through resistor 109 to diode 86. Similarly, since transistor 24 is cut off the voltage at its collector 30 is approximately —12 volts and this potential is coupled through resistor 108 to diode 81.

The second digit of the binary number is also a "1" so that the potentials at terminals 94 and 96 do not change, that is, terminal 94 is at —12 volts and terminal 96 is at approximately —2 volts. When the next positive clock pulse appears it will be blocked from transistor 23 by the —12 volts at terminal 94, and it will be blocked from transistor 50 by the —12 volts on the collector 30 of transistor 24. The positive clock pulse is coupled however, through capacitor 88 and diode 80 to the base 24 of transistor 30. However, since transistor 24 is already cut off this positive pulse has no effect on the state of bistable device 20. The clock pulse is also coupled through capacitor 106 and diode 86 to the base 56 of transistor 51, and drives transistor 51 into cut off. When transistor 51 is cut off transistor 50 conducts and bistable device 21 is now in its "1" state. Bistable devices 20 and 21 are both in their "1" state and therefore the binary number 11 has been entered.

It is to be understood that while I have shown and described specific embodiments of my invention this is for the purpose of illustration only and my invention is to be limited solely by the scope of the appended claims.

I claim as my invention:

1. Apparatus of the class described comprising: a plurality of serially connected bistable devices having input and output terminals, each of said devices having two stable states; a plurality of input gates connected to the input terminals of each of said bistable devices; a plurality of input signals connected to the input gates of the first of said plurality of bistable devices; means connecting the output terminals of each bistable device to the input gates of the succeeding bistable device; and controllable biasing means connected to said input gates to bias said gates either conducting or non-conducting so that said apparatus will operate either as a forward counter, a reverse counter, or as a shift register depending upon the magnitude of the bias from said controllable bias means.

2. Apparatus of the class described comprising: a plurality of bistable devices having input and output terminals, each of said devices having two stable states; a plurality of steering diodes connected to the input terminals of said bistable devices; counter input means connected to a first, a second, a third, and a fourth of said plurality of steering diodes of the first of said plurality of bistable devices; shift register input means connected to a fifth of said plurality of steering diodes of the first of said plurality of bistable devices; complementary shift register input means connected to a sixth of said plurality of steering diodes of the first of said plurality of bistable devices; clock input means connected to said fifth and sixth of said plurality of steering diodes of the first of said plurality of bistable devices; means connecting the output of each bistable device to the steering diodes of the succeeding bistable device; and first and second controllable biasing means connected to some of said steering diodes so that the apparatus will operate either as a forward counter, a reverse counter, or as a shift register depending on the level of bias from said controllable bias means.

3. Apparatus of the class described comprising: a plurality of serially connected bistable devices having input and output terminals; a plurality of switch means connected to the input terminals of each of said bistable devices; a plurality of input signals connected to the switch means of the first of said plurality of bistable devices; means connecting the output terminals of each bistable device to the switch means of the succeeding bistable device; and controllable biasing means connected to said switch means to bias said switch means either conducting or non-conducting, thereby controlling the passage of said input signals so that said apparatus will operate either as a forward counter, a reverse counter, or as a shift register depending upon which of said switch means pass said input signals.

4. Apparatus for use as a forward counter, a reverse counter, or a shift register comprising: first and second bistable devices having input and output terminals; a plurality of input steering diodes connected to the input terminals of said bistable devices; means connecting the output terminals of said first bistable device to the input steering diodes of said second bistable device; means for connecting a plurality of input signals to the input steering diodes of said first bistable device; and means for connecting a source of control bias having a first bias level, a second bias level, and a third bias level to said steering diodes, said apparatus operating as a forward counter when the controllable bias is at said first bias level, as said reverse counter when the controllable bias is at said second bias level, and as said shift register when the controllable bias is at said third bias level.

5. Apparatus for use as a forward counter, a reverse counter, or a shift register comprising: first and second flip-flops having input and output terminals; a plurality of "and" gates connected to the input terminals of said flip-flops; means connecting the output terminals of said first flip-flop to their "and" gates in the input circuit of said second flip-flop; input means connected to the "and" gates in the input circuit of said first flip-flop and adapted to be connected to a source of input signals; and means for connecting a source of controllable bias having a first bias level, a second bias level, and a third bias level to said "and" gates, said apparatus operating as said forward counter when the controllable bias is at said first bias level, as said reverse counter when the controllable bias is at said second bias level, and as said shift register when the controllable bias is at said third bias level.

6. A reversible counter comprising a plurality of binary stages, each having first and second output means maintained in respectively opposite states and an input means for reversing the state thereof; a forward control line; a backward control line; means for selectively energizing said forward and backward control lines at respectively different voltage levels; first diode gating means coupling respective first output means and input means of adjacent stages, first resistive means coupling said first diode gating means to said forward control line, second diode gating means coupling respective second output means and input means of adjacent stages, and second resistive means coupling said second diode gating means to said backward control line, at least one of said first and second diode gating means including a pair of diodes with one of their common electrodes interconnected, means connecting said common electrode connection to the output means of the preceding adjacent stage, and means connecting the other electrodes to the input means of the succeeding adjacent stage.

7. A reversible counter comprising a plurality of binary stages, each having first and second transistor means maintained in respectively opposite states and an input means for reversing the state thereof, said first and second transistor means having first and second output means respectively connected thereto;

a forward control line;

a backward control line;

means for selectively energizing said forward and backward control lines at respectively different voltage levels;

first diode gating means including a first pair of diodes with one of their common electrodes interconnected;

first capacitive means connecting respective common electrodes of said first pair of diodes to said first output means of the preceding adjacent stage;

first resistive means connecting said common electrodes of said first pair of diodes to said forward control line;

means connecting the other electrodes of said first pair of diodes to the input means of the succeeding adjacent stage;

second diode gating means including a second pair of diodes with one of their common electrodes interconnected;

second capacitive means connecting respective common electrodes of said second pair of diodes to said second output means of preceding adjacent stage;

second resistive means connecting said common electrodes of said second pair of diodes to said backward control line; and means connecting the other electrodes of said second pair of diodes to the input means of the succeeding adjacent stage.

8. A reversible counter comprising a plurality of binary stages, each having a first and second output means maintained in respectively opposite states and an input means for revising the state thereof;

a forward control line;

a backward control line;

means for selectively energizing said forward and backward control lines at respectively different voltage levels;

first diode means having first and second electrodes;

second diode means having first and second electrodes;

means connecting said first electrode of said first diode means to said first electrode of said second diode means;

means connecting said second electrodes of said first and second diode means to the input means of the succeeding adjacent stage;

means connecting said first electrodes of said first and second diode means to said first output means of the preceding adjacent stage;

first resistive means connecting said first electrodes of said first and second diode means to said forward control line;

third diode means having first and second electrodes;
fourth diode means having first and second electrodes;
means connecting first electrode of said third diode means to said first electrode of said fourth diode means;
means connecting said second electrodes of said third and fourth diode means to the input means of the succeeding adjacent stage;
means connecting said first electrodes of said third and fourth diode means to said second output means of the preceding adjacent stage; and
second resistive means connecting said first electrodes of said third and fourth diode means to said backward control line.

References Cited by the Examiner

UNITED STATES PATENTS

| | | | |
|---|---|---|---|
| 2,583,102 | 1/1952 | Holden | 328—44 |
| 2,816,226 | 12/1957 | Forrest et al. | 328—44 |
| 2,842,682 | 7/1958 | Clapper | 307—88.5 |
| 2,922,985 | 1/1960 | Crawford | 307—88.5 |
| 2,988,701 | 6/1961 | Clapper | 328—42 |
| 3,054,001 | 9/1962 | Chisholm et al. | 328—45 |

JOHN W. HUCKERT, *Primary Examiner.*

GEORGE N. WESTBY, *Examiner.*

J. D. CRAIG, *Assistant Examiner.*